Figure 1:
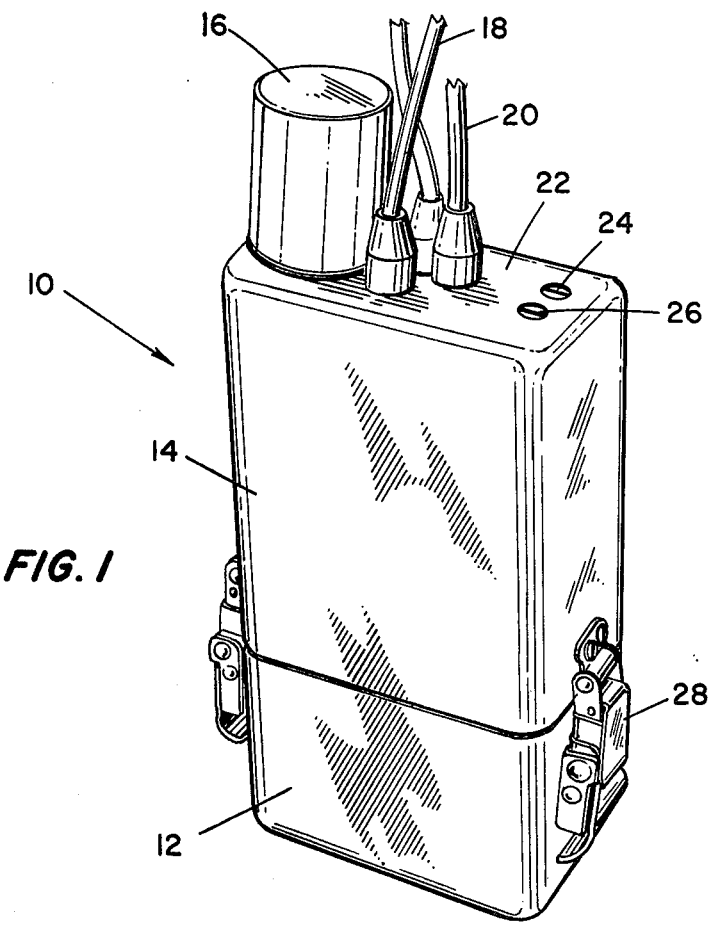

United States Patent [19]

Johnson

[11] 4,096,466
[45] Jun. 20, 1978

[54] UNDERWATER SWITCHING

[76] Inventor: Dennis J. Johnson, 2382 Bayfarm Pl., Santa Ana, Calif. 92707

[21] Appl. No.: 789,184

[22] Filed: Apr. 20, 1977

[51] Int. Cl.² .................. H04B 11/00; H01H 29/00
[52] U.S. Cl. .............................. 340/5 T; 200/61.05; 340/4 E
[58] Field of Search .............. 340/4 E, 4 R, 5 T, 3 A; 200/61.04, 61.05

[56] References Cited

U.S. PATENT DOCUMENTS

| | | | |
|---|---|---|---|
| 3,249,913 | 5/1966 | Smyth et al. | 340/3 A |
| 3,602,661 | 8/1971 | Liedberg | 200/61.05 |
| 3,727,182 | 4/1973 | Snyder | 200/61.05 |
| 3,821,699 | 6/1974 | Marus et al. | 200/61.04 |
| 3,914,592 | 10/1975 | Maxey | 200/61.04 |

Primary Examiner—Richard A. Farley
Attorney, Agent, or Firm—Grover A. Frater

[57] ABSTRACT

Underwater switching of electrical apparatus is accomplished by providing two terminals at the exterior surface of a unit to be immersed in water so that a conductive bridge is formed between the terminals through the water. Those terminals are included in a circuit in which switching action is to occur. To switch the circuit, at least one of the two terminals is covered so that it is no longer engaged by the water through which the conductor bridge is formed. In one form of the invention, one of the terminals is covered with one of the user's fingers.

To provide a positive switching action and to insure that switching action results, whether the bridge is formed through highly conductive salt water or less conductive fresh water, the switching circuit is arranged so that the impedance to flow of an element in that circuit is made to change greatly in response to covering of one of the terminals. In one form, that function is accomplished by including a Zener diode in series with the switch terminals.

3 Claims, 2 Drawing Figures

UNDERWATER SWITCHING

This invention relates to methods and means for accomplishing switching in underwater electric apparatus.

BACKGROUND OF THE INVENTION

There is a variety of apparatus which is intended for use underwater and which includes electric circuitry that must be switched by an underwater operator while the apparatus is immersed. Examples include cameras, electronic measuring instruments, electrically controlled tools, underwater communications equipment, and other apparatus. To provide a switch that can be easily operated in the underwater environment and which does not involve risk that water will find its way into the apparatus, has proven to be a troublesome task. One approach employs a mechanical switch having moving parts that can be actuated from the exterior of the housing of an underwater apparatus. That approach requires the use of seals around the switch actuator of the use of boots or flexible, or pliant, housing wall sections which permit operation of switch actuators mounted within the housing. Even in the latter case, a sealing means of some kind is required around the boots and rubber covered wall openings, and the like. While the sealing problem is less severe than in the case of a movable actuator that extends through the case wall, pliant and resilient boots and covers tend to deteriorate and crack after a short time, especially in the case of units that are taken in and out of salt water frequently.

An alternative to such mechanical switching is to employ a sensor of some kind whose output is electrical in response to a condition that can be created selectively underwater by the user. Examples include proximity sensors using a change in capacitance, a very difficult approach in electrically conductive salt water, and voice actuated switching. Voice actuated switching is practical, especially for underwater communication equipment, but it presents problems in noisy environments.

Despite past efforts there has been a continuing need for low cost underwater switching apparatus that is reliable in both fresh and salt water and requires little or no maintenance.

SUMMARY OF THE INVENTION

It is an object of this invention to do just that — to provide a method by which low cost, reliable underwater switching is made possible, and to provide an apparatus for practicing that method.

A pair of electrodes, connected to electrical circuitry within a housing, are exposed at the surface of the housing such that a flowpath for electric current through the water is formed when the housing is submerged. That flowpath is interrupted, when switch action is required, by covering one of the two electrodes. Covering of the electrode may be accomplished in any convenient manner that breaks continuity of the electrical path from the covered electrode to the water bridge between electrodes or appreciably increases the impedance of that path. In one preferred form, the method is practiced by covering one of the electrodes with the user's finger.

The method of the invention can be practiced with an apparatus that has two electrodes exposed at the exterior surface of some kind of housing for the apparatus to be controlled, or for conductors that interconnect the electrodes with such an apparatus and which are interconnected with circuitry through which current will flow when an external conductive path is formed between the two electrodes.

Electrical switching often requires more than mere completion and interruption of an electrical circuit. In a given application, it may be required that current flow be changed by not less than some given degree, or that it change from a value less than one current to a value greater than some other current. Such requirements may be met in the invention by adjustment of electrodes spacing and surface area of the electrodes. For example, in the case of an underwater communications unit in which it is required to switch electrical circuitry to change between receive and transmit modes, electrodes having an exposed surface area such as is provided by an electrode diameter between ⅛th and ¼th of an inch works best. It works best especially when used with an electrode spacing from ⅓rd of an inch up to about 1 ½ inches in salt water and up to one inch in fresh water.

Creating an embodiment that will provide adequate switching action, in the sense of adequate current or voltage change, whether the electrodes are immersed in salt water or fresh water, is more difficult. Fresh water is usually much less conductive than is salt water whereby the path resistance in the "switch closed" condition is greater in fresh water than it is in salt water. Further, there are some applications in which the amount of switch closed resistance in the switched circuit effects performance in that circuit. These several problems and requirements are solved or satisfied by another feature of the invention. In accordance with that feature, the change in circuit resistance as an incident to covering one of the electrodes while the two are immersed is made to change the electrical characteristics of an element that is included in circuit with the electrodes and the internal circuit that is to be switched. In the preferred form of the invention, that element is made to change its electrical characteristics in large degree in response to a change in resistance between the exposed terminals at some selected value of that resistance.

One preferred way in which that method can be practiced is to include, in series or in parallel with the electrodes, an element which alters its impedance to current flow greatly in response to applied voltage. In this connection, the best mode for practicing the invention, thus far discovered, is to include a Zener diode in series with the electrodes. Its value is chosen so that the voltage applied to it changes through the Zener voltage when one of the electrodes is covered such that high resistance appears across the electrode pair. To provide such a method and such apparatus is another object of the invention. Indeed, apparatus made according to the invention can provide the advantage of high reliability and low cost, and the further advantage of compatibility with a wide range of switched circuits.

Figure 2:
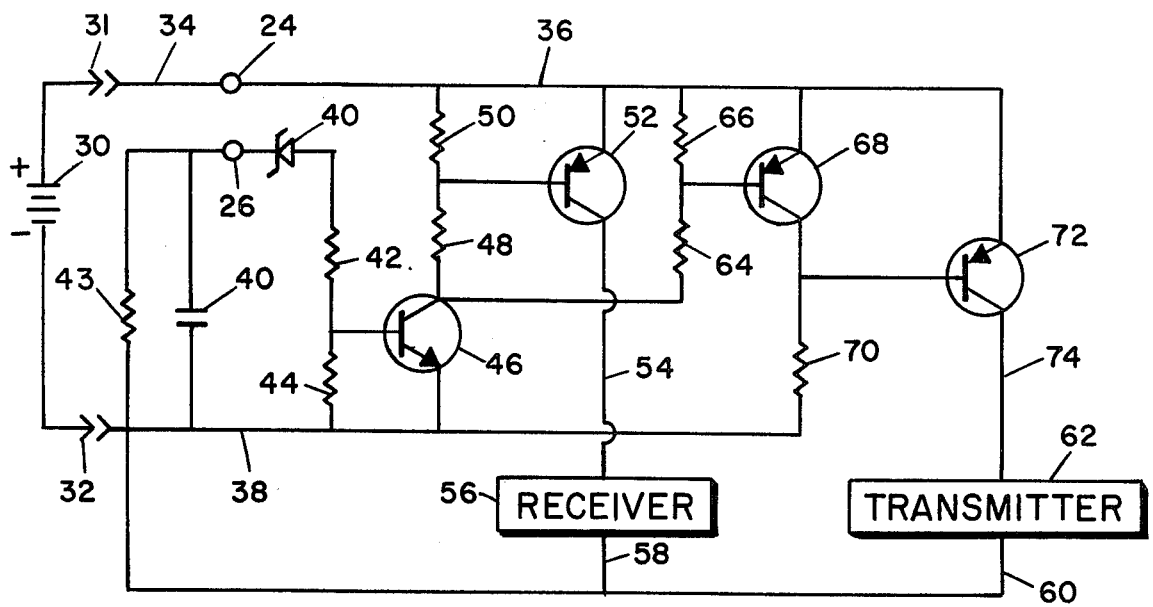

In the drawings:

FIG. 1 is an isometric drawing of an underwater sonic communications transceiver, less microphone and earphone, which embodies the invention; and FIG. 2 is a schematic diagram of a circuit in which the invention is embodied.

In FIG. 1, the numeral 10 identifies an underwater communications transceiver. The lower portion of the unit is designated 12. It includes batteries by which the upper transceiver unit 14 is powered. That upper unit includes a transmitter and a receiver. Underwater sound waves arriving at the transducer 16, at the upper wall of the transceiver unit 14, are converted to electrical impulses that are amplified and are applied to an earphone (not shown) by conductor leads 18 at the upper wall of the unit. Voice signals from a microphone (not shown) are directed into the transceiver 14 by a microphone cord 20 which is connected to the unit at its upper wall. The transducer, the microphone and earphone cables and connectors, and indeed the transceiver housing itself, are all formed of a material that is not electrically conductive. In preferred form, the transceiver housing is formed of plastic and it has two electrodes embedded in its upper wall 22 so that those electrodes, which are formed of a corrosive resistant conductive metal, are exposed at the exterior surface of the housing. In this case, there are two electrodes identified by the numerals 24 and 26. They are molded into the plastic housing so that there is no opportunity for water to enter around the electrodes into the interior of the case. In this embodiment, they are spaced a little less than one inch apart. At least one should have a diameter no less than ⅛th inch and the other should be no smaller. In this case, both are ⅛th of an inch in diameter.

The battery unit 12 is held to the transceiver unit 14 by a pair of manually operable fasteners 28, only one of which is visible in FIG. 1. When the battery unit is attached to the transceiver, as shown, electrical connections are made from the battery unit to the transceiver such that the battery, the receiver, and the transmitter are in circuit with one another and with the two electrodes 24 and 26. The arrangement is such that mere immersion of the unit 10 results in energization of the receiver and de-energization of the transmitter. In that condition, sonic signals arriving at the transducer 16 are applied to the receiver and by the receiver to the operator's earphone. The receiver is energized because a conductive path is formed between electrodes 24 and 26 as an incident to the immersion of the unit in water. The user need only place a finger, or otherwise cover, one of the two electrodes when he wishes to transmit. Covering one of the electrodes will increase the resistance of the conductive path between them to provide a switching action that results in a turning off of the receiver and activation of the transmitter. Sounds picked up by the user's microphone will be applied to the transmitter where they are amplified and processed. Ultimately, they are applied to the transducer 16 from which corresponding sounds are radiated into the water.

A preferred form of circuitry by which that switch and the transmitter, receiver, and battery are interconnected is illustrated in FIG. 2.

In FIG. 2, the battery 30 is the one that is housed in battery case 12 of FIG. 1. It is connected by terminals 31 and 32, not visible in FIG. 1, to electrical circuitry in the transceiver unit 14. That circuitry includes a conductor 34 by which the positive terminal of battery 30 is connected to electrode 24 and to a positive line 36. The negative side of the battery is connected by connector 32 to a negative line 38.

The terminal 26 of FIG. 1 appears just below terminal 24 in FIG. 2. It is connected to the negative line 38 through a capacitor 40 and a resistor 43 connected in parallel. Terminal 26 is also connected to negative line 38 through the series combination of a Zener diode 40, a resistor 42, and another resistor 44. The junction of resistors 42 and 44 is connected to the base of NPN transistor 46 whose emitter is connected to ground and whose collector is connected to the positive line 36 through the series combination of a resistor 48 and a second resistor 50. The junction between resistors 48 and 50 is connected to the base of PNP transistor 52 whose emitter is connected to positive line 36 and whose collector is connected to the positive power input line 54 of the receiver section 56 of transceiver unit 14. The negative power line 58 from the receiver is connected to the negative line 38 along with the negative power line 60 from the transmitter unit 62 of the transceiver.

The collector of trasistor 46 is also connected to the positive line 36 through the series combination of a first resistor 64 and a second resistor 66. The junction between those two resistors is connected to the base of PNP transistor 68 whose collector is connected through load resistor 70 to negative line 38. The collector of transistor 68 is also connected to the base of PNP transistor 72 whose emitter is connected to the positive line 36 and whose collector is connected to the positive power line 74 of the transmitter unit 62.

The values of the several circuit components are selected so that the transistors will operate as switches. The switching of transistors 52, 68, and 72 is accomplished as an incident to switching of transistor 46. When transistor 46 is turned on, current in resistors 48, 50, 64, and 66 is increased. The bias applied to transistors 52 and 68 will be altered so that they, too, are turned on. Transistor 52 having been turned on, presents very low impedance to the flow of current from positive line 36 through the emitter and collector of the transistor and through receiver supply line 54 to the receiver 56. As a consequence, the receiver is rendered operative.

Transistor 68 having been turned on, the base of transistor 72 is effectively connected to the positive line and that transistor is turned off. Consequently, a high impedance is presented in the positive supply line to transmitter 62 and the transmitter is turned off.

When transistor 46 is turned off, bias at transistors 52 and 68 will be altered so that they, too, will be turned off. Transistor 52 having been turned off, a high resistance is presented in the positive supply line 54 and the receiver is turned off. Transistor 68 having been turned off, the bias to transistor 72 is altered so that it is turned on and it effectively connects the positive supply line 74 of transmitter 62 to the positive supply line 36. Accordingly, the transmitter 62 is turned on.

When the unit is immersed in water, a conductive path is formed between terminals 24 and 26 the resistance of which will be low if the unit is immersed in salt water and will be but a few thousand ohms if immersed in ordinary fresh water. In that circumstance, the conductive path through the water is in series with Zener diode 40, resistor 42, and the parallel combination of resistor 44 and the base-to-emitter circuit of transistor 46. In a representative case, the battery 30 has a potential of 12 volts. Resistor 44 has a value of 1,000 ohms, and resistor 42 a value of 47000 ohms. The Zener diode is type 1749 having a Zener voltage of three volts.

The effect of resistor 42 can be neglected because it has a high value. The Zener voltage of diode 40 will be exceeded if the resistance across terminals 24 and 26 is less than 15,000 to 20,000 ohms. In that circumstance, a sufficient base current will flow in transistor 46 to cause it to turn on whereby the receiver 56 will be turned on and the transmitter 62 will be turned off. However, if the connection between terminals 24 and 26 is interrupted by placement of a finger upon one terminal or the other, the resistance of the path across the terminals will have been increased substantially above 20,000 ohms. The resistance across the terminals 26 and 24 having been increased to a high value, current flow is limited so that the voltage across the diode 40 is less than the Zener voltage. In that circumstance, it offers a very high impedance to current flow. As a consequence, base current in transistor 46 is effectively turned off. Transistors 52 and 68 are also turned off, and transistor 72 is turned on. As a consequence, receiver 56 is turned off and the transmitter 62 is turned on.

The combination of resistor 42 and capacitor 40 represent the high impedance microphone. Typical values for those elements are 10,000 ohms in the case of the resistor and 0.47 microfareds for the capacitor. Such a microphone will provide voice operated transmit or "VOX" operation in this same circuit. Although not part of the invention, the microphone elements are shown to illustrate that the switching system of the invention is compatible with VOX operation.

While the invention is shown applied to an underwater communications system having a control circuit of the kind illustrated in FIG. 2, it will be apparent to those having ordinary skill in this art that other circuit arrangements are possible and that the invention can be applied to the control of apparatus other than communications systems. Accordingly, the invention is not to be considered to be limited to the specific embodiments illustrated in the drawings, but rather by the scope of its claims.

I claim:

1. In a submersible unit housed in an enclosure part of which is exposed to water when submersed:
   power connections for electrical connection to an electric battery;
   a pair of electrical electrodes carried by said part of said enclosure such that an electrical current path is formed between said pair of electrodes when said enclosure is immersed in water;
   a circuit extending between said power connection and comprising said pair of contacts and an element exhibiting impedance;
   switch means responsive to a change in electrical flow in said element; said submersible unit comprising an underwater, sonic, communications system comprising a transmitter and a receiver; and
   means responsive to actuation of said switch from one state to another to render said receiver operative and disable said transmitter and responsive to actuation of said switch from said other state to said one state to render said transmitter operative and to disable said receiver.

2. The invention defined in claim 1 in which said element is a Zener diode connected in series with the impedance appearing across said electrodes, and in which said switch comprises a solid state switch responsive to current flow through said diode;
   and in which said means comprises a pair of solid state switches, one in series with each of said transmitter and receiver and means for turning said solid state switches on and off in response to current flow through the first mentioned switch.

3. In a submersible unit housed in an enclosure part of which is exposed to water when submersed:
   power connections for electrical connection to an electric battery;
   a pair of electrical electrodes carried by said part of said enclosure such that an electrical current path is formed between said pair of electrodes when said enclosure is immersed in water;
   a circuit extending between said power connection and comprising said pair of contacts and an element exhibiting impedance;
   switch means responsive to a change in electrical flow in said element;
   said submersible unit comprising an underwater communications system comprising a transmitter and a receiver;
   means responsive to actuation of said switch from one state to another to render said receiver operative and disable said transmitter and responsive to actuation of said switch from said other state to said one state to render said transmitter operative and to disable said receiver.

* * * * *